United States Patent
Koop

(10) Patent No.: US 11,485,809 B2
(45) Date of Patent: Nov. 1, 2022

(54) METHOD FOR PRODUCING AMIDO-METHYLATED VINYL-AROMATIC BEAD POLYMERS

(71) Applicant: LANXESS Deutschland GmbH, Cologne (DE)

(72) Inventor: Bernd Koop, Cologne (DE)

(73) Assignee: LANXESS Deutschland GmbH, Cologne (DE)

(*) Notice: Subject to any disclaimer, the term of this patent is extended or adjusted under 35 U.S.C. 154(b) by 256 days.

(21) Appl. No.: 16/311,296

(22) PCT Filed: Jun. 9, 2017

(86) PCT No.: PCT/EP2017/064079
§ 371 (c)(1),
(2) Date: Dec. 19, 2018

(87) PCT Pub. No.: WO2018/001698
PCT Pub. Date: Jan. 4, 2018

(65) Prior Publication Data
US 2020/0109225 A1    Apr. 9, 2020

(30) Foreign Application Priority Data

Jun. 29, 2016 (EP) .................................. 16177010
Aug. 3, 2016 (EP) .................................. 16182499

(51) Int. Cl.
| | | |
|---|---|---|
| C08F 212/08 | (2006.01) | |
| C08F 8/30 | (2006.01) | |
| C08F 212/36 | (2006.01) | |
| C08K 5/41 | (2006.01) | |
| C08K 5/06 | (2006.01) | |
| C08K 5/03 | (2006.01) | |
| C08K 5/159 | (2006.01) | |
| C08K 5/3417 | (2006.01) | |

(52) U.S. Cl.
CPC .............. *C08F 212/08* (2013.01); *C08F 8/30* (2013.01); *C08F 212/36* (2013.01); *C08K 5/03* (2013.01); *C08K 5/06* (2013.01); *C08K 5/159* (2013.01); *C08K 5/3417* (2013.01); *C08K 5/41* (2013.01)

(58) Field of Classification Search
CPC ........ C08F 212/08; C08F 8/30; C08F 212/36; C08K 5/3417; C08K 5/06; C08K 5/03; C08K 5/159; C08K 5/41
See application file for complete search history.

(56) References Cited

U.S. PATENT DOCUMENTS

| | | | | |
|---|---|---|---|---|
| 3,081,274 A | * | 3/1963 | Heine | ........................ C08F 8/30 |
| | | | | 524/463 |
| 3,925,264 A | * | 12/1975 | Corte | ........................ C08F 8/30 |
| | | | | 521/33 |
| 4,232,125 A | * | 11/1980 | Buske | ...................... B01J 41/14 |
| | | | | 521/32 |
| 4,427,794 A | | 1/1984 | Lange | |
| 6,649,663 B1 | | 11/2003 | Klipper | |
| 7,053,129 B1 | | 5/2006 | Klipper | |
| 2002/0151447 A1 | | 10/2002 | Henry | |
| 2016/0108199 A1 | | 4/2016 | Klipper | |
| 2016/0200887 A1 | | 7/2016 | Klipper | |

FOREIGN PATENT DOCUMENTS

CN         103214834 A      7/2013

OTHER PUBLICATIONS

Organikum, VEB Deutscher Verlag der Wissenschaften, Berlin 1968, 8th edition, p. 479.
International Search Report from corresponding International Applicaton PCT/EP2017/064079, dated Oct. 19, 2017, dated Dec. 20, 2016, three pages.
L.A. Errede: "Polymer swelling 2: A restudy of poly(styrene-co-divinylbenzene) swelling . . .", Journal of Applied Polymer Science, vol. 31, 1986, pp. 1749-1761.
Klra Verebl Yi et al: "Cationic polymerization of styrene by the TiCl/N,N,N,N-tetramethylethylenediamine(TMEDA) catalyst system in benzotrifluoride, an environmentally benign solvent, at room temperature", Polymer, Elsevier Science Publishers B.V, GB, Bd. 53, Nr. 16, May 27, 2012 (May 27, 2012), pp. 3426-3431.

* cited by examiner

*Primary Examiner* — Robert D Harlan
(74) *Attorney, Agent, or Firm* — Nicanor A. Kohncke; Christopher L. McDavid; Ewa M. Wozniak

(57) ABSTRACT

The invention relates to a method of producing amidomethylated vinylaromatic bead polymers.

18 Claims, No Drawings

METHOD FOR PRODUCING AMIDO-METHYLATED VINYL-AROMATIC BEAD POLYMERS

The invention relates to a method of producing amidomethylated vinylaromatic bead polymers.

Amidomethylated vinylaromatic bead polymers are important intermediates in the synthesis of ion exchangers and chelating resins. Methods of producing monodisperse phthalimidomethylated vinylaromatic bead polymers are known from U.S. Pat. No. 6,649,663 B1 and U.S. Pat. No. 7,053,129 B1. The initial step in either method comprises forming N methylolphthalimide which, in a further step, is converted into bis(phthalimidomethyl) ether by acid catalysis. The bis(phthalimidomethyl) ether is then converted in a third step into its $SO_3$-adduct which is reacted with monodisperse bead polymers to form the monodisperse phthalimidomethylated vinylaromatic bead polymer. The disadvantage with either method is the large number of reaction steps, the equipment intensity and the need for time-intensive supervision, making them ecologically and economically inefficient.

The problem addressed by the present invention was therefore that of providing a method that overcomes the disadvantages of the prior art and provides amidomethylated vinylaromatic bead polymers in an efficient manner.

It has now been found that, surprisingly, the reaction of vinylaromatic bead polymers with condensed formaldehydes and protic acids, in the presence of selected aromatic solvents, will proceed under suitable reaction conditions to give amidomethylated vinylaromatic bead polymers in high yields.

The present invention accordingly provides a method of producing amidomethylated vinylaromatic bead polymers that comprises reacting at least one vinylaromatic bead polymer with at least one compound of formula (I) or salts thereof

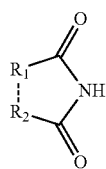
(I)

where $R_1$=—CH—($C_1$-$C_6$-alkyl) or —$CH_2$— and $R_2$=—CH—($C_1$-$C_6$-alkyl) or —$CH_2$— or $R_1$ and $R_2$ are two carbon atoms of an aromatic $C_6$-ring optionally substituted by one or two $C_1$-$C_6$-alkyl radials or $R_1$ and $R_2$ each represent —CH═, and at least one condensed formaldehyde in the presence of at least one protic acid and in the presence of at least one compound of the formula (II)

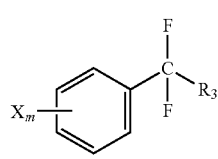
(II)

where $R_3$=$C_1$-$C_4$-alkyl, F or Cl or wholly or partly chlorinated or fluorinated $C_1$-$C_4$-alkyl and X═Cl or F and m=0, 1 or 2.

$R_1$ and $R_2$ preferably combine to form a $C_1$-$C_6$-alkyl-substituted aromatic $C_6$-ring. $R_1$ and $R_2$ more preferably represent a benzene ring, which is optionally substituted by $C_1$-$C_4$-alkyl. It is very particularly preferable for compounds of formula (I) to be phthalimide, succinimide or maleimide. It is yet more preferable for the compound of formula (I) to be phthalimide. When phthalimide is used, the invention provides phthalimidomethylated bead polymers. References to the salts of the compounds of formula (I) are to be understood as meaning in general addition products of organic or inorganic acids or bases with compounds of formula (I), e.g., chloride, sulfate, sulfite, phosphate, phosphite, acetate, oxalate, tartrate, formate or citrate. Any salts employed are preferably the chlorides or sulfates of the compounds of formula (I).

$C_1$-$C_6$-Alkyl and $C_1$-$C_4$-alkyl for the purposes of the invention represent a straight-chain, cyclic, branched or unbranched alkyl moiety having respectively 1 to 6 and 1 to 4 carbon atoms. $C_1$-$C_6$-Alkyl illustratively and preferably represents methyl, ethyl, n-propyl, isopropyl, n-butyl, i-butyl, s-butyl, t-butyl, cyclopropyl, n-propyl, 1-methylbutyl.

$C_1$-$C_4$-Alkyl illustratively and preferably represents methyl, ethyl, n-propyl and isopropyl.

Condensed formaldehyde is to be understood as meaning condensates of formaldehyde. Compounds of this type are prepared by customary methods known to a person skilled in the art. Compounds employed as condensed formaldehydes include, for example, those of formula (III)

(III)

where n is =8 to 100. Preference is given to employing compounds of formula (III), where n is =8 to 15. Particular preference is given to employing compounds of formula (III), where n is =8 to 30.

But it is also possible to employ cyclic condensates such as, for example, trioxane. It is particularly preferable for paraformaldehyde or trioxane or mixtures thereof to be employed as condensed formaldehyde. It is very particularly preferable to employ paraformaldehyde as condensed formaldehyde.

The compounds of formula (II) are specifically swellants for the bead polymers, but likewise serve as solvents in respect of the other reactants involved in the amidoalkylation reaction. Employed as compound of formula (II) for the purposes of the invention are benzotrifluoride, pentafluoroethanebenzene, pentachloroethanebenzene, 4-chlorobenzotrifluoride, 3-chlorobenzotrifluoride, 2-chlorobenzotrifluoride, dichlorobenzotrifluoride, difluoroethanebenzene, 3,4-dichlorobenzotrifluoride, heptafluoropropanebenzene or 1,1-difluoropentachloropropanebenzene, or mixtures of these compounds. Employed with particular preference as compounds of formula (II) are chlorobenzotrifluoride, dichlorobenzotrifluoride and benzotrifluoride or mixtures of these compounds. Employed with very particular preference as compound of formula (II) is benzotrifluoride.

Protic acids used may, for example, be inorganic or organic protic acids. Inorganic protic acids used are, for example, hydrochloric acid, sulfuric acid, oleum, nitric acid, nitrous acid, sulfurous acid, aliphatic or aromatic methane, benzene- or toluenesulfonic acids or phosphoric acid. Useful organic protic acids include, for example, oxalic acid, acetic acid or formic acid. Preference is given to using inorganic protic acids. Protic acids used are more preferably sulfuric acid or oleum.

Bead polymers for the purposes of the present invention are spherical crosslinked chain growth addition polymers. Vinylaromatic as used herein comprehends polyvinylaromatic and monovinylaromatic monomers. The vinylaromatic bead polymers are prepared employing for example at least one monovinylaromatic compound and at least one polyvinylaromatic compound. However, it is also possible to use mixtures of two or more monovinylaromatic compounds or mixtures of two or more polyvinylaromatic compounds. Preference for preparing the vinylaromatic bead polymers is given to employing at least one monovinylaromatic compound and at least one polyvinylaromatic compound.

Monovinylaromatic compounds employed for the purposes of the present invention are preferably monoethylenically unsaturated compounds, for example styrene, vinyltoluene, ethylstyrene, α-methylstyrene, chlorostyrene and chloromethyistyrene.

Particular preference is given to employing styrene or mixtures of styrene with the aforementioned monomers.

Preferred polyvinylaromatic compounds for the purposes of the present invention are multifunctional ethylenically unsaturated compounds, for example divinylbenzene, divinyltoluene, trivinylbenzene, divinylnaphthalene or trivinylnaphthalene.

The polyvinylaromatic compounds are generally employed in amounts of 1-20 wt %, preferably 2-12 wt %, more preferably 4-10 wt %, based on the monomer or its mixture with further monomers. The type of polyvinylaromatic compound (crosslinker) is selected with a view to the later use of the bead polymer. Divinylbenzene is suitable in many cases. Commercial divinylbenzene grades which, in addition to the isomers of divinylbenzene, also contain ethylvinylbenzene are sufficient for most applications.

In a preferred embodiment, the vinylaromatic bead polymers are styrene/divinylbenzene-crosslinked copolymers.

A preferred embodiment of the present invention employs microencapsulated monomer droplets.

Possible materials for the microencapsulation of monomer droplets are those known for employment as complex coacervates, in particular polyesters, natural and synthetic polyamides, polyurethanes, polyureas.

Gelatin for example is very useful as natural polyamide. Gelatin is especially employed in the form of coacervate and complex coacervate. For the purposes of the invention, gelatin-containing complex coacervates are, in particular, combinations of gelatin with synthetic polyelectrolytes. Suitable synthetic polyelectrolytes are copolymers incorporating units of, for example, maleic acid, acrylic acid, methacrylic acid, acrylamide and methacrylamide. Particular preference is given to acrylic acid and acrylamide. Gelatin-containing capsules can be hardened with conventional hardeners, for example formaldehyde or glutaraldehyde. The encapsulation of monomer droplets with gelatin, gelatin-containing coacervates and gelatin-containing complex coacervates is extensively described in EP A 0 046 535. The methods for encapsulation with synthetic polymers are known. An example of a very useful method is that of phase interface condensation where a reactive component, for example an isocyanate or an acyl chloride, dissolved in monomer droplets is made to react with a second reactive component, for example an amine, dissolved in the aqueous phase.

The optionally microencapsulated monomer droplets optionally contain an initiator or mixtures of initiators to induce the polymerization. Useful initiators for the method of the present invention include, for example, peroxy compounds such as dibenzoyl peroxide, dilauroyl peroxide, bis(p-chlorobenzoyl) peroxide, dicyclohexyl peroxydicarbonate, tert-butyl peroctoate, tert-butyl peroxy-2-ethylhexanoate, 2,5-bis(2-ethylhexanoylperoxy)-2,5-dimethylhexane or tert-amylperoxy-2-ethylhexane, and also azo compounds such as 2,2'-azobis(isobutyronitrile) or 2,2'-azobis(2-methylisobutyronitrile).

The initiators are generally applied in amounts of 0.05 to 2.5 wt %, preferably 0.1 to 1.5 wt %, based on the monomer mixture.

Porogens may optionally be further used in the optionally microencapsulated monomer droplets in order to generate a macroporous structure in the bead polymer. Useful porogens include organic solvents that are coagulants for polymers in that they are poor solvents and/or swellants for the polymer formed. Examples are hexane, octane, isooctane, isododecane, methyl ethyl ketone, butanol or octanol and isomers thereof. The porogen used is preferably isododecane. Porogens are preferably used in the preparation of the amidomethylated vinylaromatic bead polymers of the invention.

The terms microporous or gellike/macroporous are already extensively described in the technical literature.

Preferred bead polymers for the purposes of the present invention have a macroporous structure.

The optionally microencapsulated monomer droplets may optionally also contain up to 30 wt % (based on the monomer) of crosslinked or uncrosslinked polymer. Preferred polymers derive from the aforementioned monomers, more preferably from styrene.

Bead polymers may be produced in heterodisperse or monodisperse form. Heterodisperse bead polymers are produced according to general processes known to those skilled in the art, as for example by means of suspension polymerization.

Preference is given to producing monodisperse vinylaromatic bead polymers in the method of the invention.

Monodisperse, in the present application, refers to those substances in which at least 90% by volume or mass of the particles have a diameter located in an interval centered on the modal diameter and having a width amounting to +/−10% of the modal diameter.

There is, for example, a substance where the size interval within which at least 90% by volume or mass are located is between 0.45 mm and 0.55 mm when the modal diameter is 0.5 mm and between 0.77 mm and 0.63 mm when the modal diameter is 0.7 mm.

The monodisperse bead polymer is obtainable by the methods known from the literature. The aqueous phase involved in preparing monodisperse bead polymer is obtainable by the methods known from the literature. Monodisperse vinylaromatic bead polymers may optionally contain a dissolved polymerization inhibitor. Preferably, the aqueous phase does contain a dissolved polymerization inhibitor. Both organic and inorganic inhibitors are useful for the purposes of the present invention. Examples of inorganic inhibitors are nitrogen compounds such as hydroxylamine, hydrazine, sodium nitrite and potassium nitrite, salts of phosphorous acid such as sodium hydrogenphosphite and also sulfurous compounds such as sodium dithionite, sodium thiosulfate, sodium sulfite, sodium bisulfite, sodium thiocyanate and ammonium thiocyanate. Examples of organic inhibitors are phenolic compounds such as hydroquinone, hydroquinone monomethyl ether, resorcinol, pyrocatechol, tert-butylpyrocatechol, pyrogallol and condensation products of phenols with aldehydes. Useful organic inhibitors further include nitrogenous compounds. These include hydroxylamine derivatives such as, for example, N,N-diethylhydroxylamine, N-isopropylhydroxylamine and also sulfonated or carboxylated N-alkylhydroxylamine or N,N-dialkylhydroxylamine derivatives, hydrazine derivatives such as, for example, N,N-hydrazinodiacetic acid, nitroso compounds such as, for example, N-nitrosophenylhydroxylamine, N-nitrosophenylhydroxylamine ammonium salt or N-nitrosophenylhydroxylamine aluminum salt. The concentration of the inhibitor is 5-1000 ppm based on the aqueous phase, preferably 10-500 ppm, more preferably 10-250 ppm.

The polymerization of the optionally microencapsulated monomer droplets to form the monodisperse vinylaromatic bead polymer is optionally carried out, as already mentioned above, in the presence of one or more protective colloids in the aqueous phase. Useful protective colloids include natural or synthetic water-soluble polymers, for example, gelatin, starch, polyvinyl alcohol, polyvinylpyrrolidone, polyacrylic acid, polymethacrylic acid or copolymers formed from (meth)acrylic acid and from (meth)acrylic esters. Very useful protective colloids further include cellulose derivatives, in particular cellulose esters and cellulose ethers, such as carboxymethylcellulose, methylhydroxyethylcellulose, methylhydroxypropylcellulose and hydroxyethylcellulose. Gelatin is particularly useful. The amount of protective colloids used is generally in the range from 0.05 to 1 wt % based on the aqueous phase, preferably from 0.05 to 0.5 wt %.

The polymerization to form the monodisperse vinylaromatic bead polymer may optionally also be carried out in the presence of a buffer system. Preferred buffer systems establish the pH of the aqueous phase at the start of the polymerization at a value between 14 and 6, preferably between 12 and 8. Under these conditions, protective colloids having carboxylic acid groups are wholly or partly present as salts. This causes a favourable effect on the action of the protective colloids. Particularly suitable buffer systems contain phosphate or borate salts. The terms "phosphate" and "borate" in the context of the invention also encompass the condensation products of the ortho forms of corresponding acids and salts.

The concentration of the phosphate/borate in the aqueous phase is 0.5-500 mmol/l, preferably 2.5-100 mmol/l.

Stirrer speed is less critical in the polymerization and, in contradistinction to conventional bead polymerization, has no influence on particle size. Low stirrer speeds are employed, these being sufficient to keep the suspended monomer droplets in suspension and to promote the removal of the heat of polymerization. For this task, it is possible to use various stirrer types. Particularly suitable stirrers are gate stirrers having axial action.

The volume ratio of encapsulated monomer droplets to aqueous phase is from 1:0.75 to 1:20, preferably 1:1 to 1:6.

The polymerization temperature depends on the fragmentation temperature of the initiator employed. It is generally between 50 to 180° C., preferably between 55 and 130° C. The polymerization takes from 0.5 to several hours. It has been found to be useful to employ a temperature program in which the polymerization is commenced at low temperature, for example 60° C., and the reaction temperature is raised with increasing polymerization conversion. In this way, for example, the requirement for reliable running of the reaction and high polymerization conversion can be fulfilled very efficiently. After polymerization, the polymer is isolated using customary procedures, for example by filtration or decanting, and optionally washed.

In a further step, the vinylaromatic bead polymer is reacted with at least one compound of the formula (I), at least one condensed formaldehyde in the presence of at least one compound of formula (II) and in the presence of at least one protic acid to form the amidomethylated vinylaromatic bead polymer.

For example, the vinylaromatic bead polymer may initially be swelled and mixed in this state with a mixture formed from the compounds of formula (I), from the condensed formaldehyde and from the protic acids. Similarly, however, the compounds of formula (I) could initially be added to the crosslinked bead polymers in the presence of the compound of formula (II) followed by the addition of the condensed formaldehyde and then of the protic acids.

Preferably, the crosslinked bead polymer is initially swelled in the presence of the compound of formula (II), and then the compounds of formula (I) or the condensed formaldehyde are added and then the protic acid is added. The compound of formula (II) is preferably removed by distillation. The reaction products are worked up by processes known to those skilled in the art. Preferably, the reaction mixture is heated. The reaction is preferably carried out as a one-pot reaction.

The amount-of-substance ratio of the compounds of formula (II) to the compounds of formula (I) is generally in the range from 2:1 to 10:1. The amount-of-substance ratio of the compounds of formula (II) to the compounds of formula (I) is preferably in the range from 3.5:1 to 9:1.

The amount-of-substance ratio of the aromatic groups in the vinylaromatic bead polymer to the compounds of formula (I) is for example in the range from 0.2:1 to 2.5:1. The amount-of-substance ratio of the aromatic groups in the vinylaromatic bead polymer to the compounds of formula (I) is preferably in the range from 0.5:1 to 1.8:1.

The amount-of-substance ratio of compounds of formula (I) to condensed formaldehyde is for example in the range from 0.7:1 to 1.3:1. The amount-of-substance ratio of compounds of formula (I) to condensed formaldehyde is preferably in the range from 0.95:1 to 1.1:1.

The amount-of-substance ratio of the compounds of formula (I) to the protic acid employed is generally between 10:1 to 1:10. The amount-of-substance ratio of the compounds of formula (I) to the protic acid employed is preferably in the range from 1:1 to 1:10.

The reaction temperature for the conversion of the vinylaromatic bead polymers into the amidomethylated vinylaromatic bead polymers is generally between 10° C. and 70° C. The reaction temperature for the conversion of the vinylaromatic bead polymers into the amidomethylated vinylaromatic bead polymers is preferably between 20° C. and 40° C.

The reaction is generally carried out under atmospheric pressure. However, the reaction can also be carried out under higher or lower pressures.

The amidomethylated vinylaromatic bead polymers are in particular significant intermediates for the production of ion exchangers and chelating resins. It is thus possible, for instance, to prepare ion exchangers, in particular anion exchangers, and chelating resins from the amidomethylated vinylaromatic bead polymers obtained by the method of the present invention.

The amidomethylated vinylaromatic bead polymer is then convertible in a further step into aminomethylated vinylaromatic bead polymers. Preferably, the amidomethylated vinylaromatic bead polymer is further converted into aminomethylated vinylaromatic bead polymers. The conversion is generally effected by treating the amidomethylated vinylaromatic bead polymer with aqueous or alcoholic solutions of an alkali metal hydroxide, such as sodium hydroxide or potassium hydroxide, at temperatures between 100° C. and 250° C., preferably at temperatures between 120° C. and 190° C. It is preferable to perform the conversion with alkali metal or alkaline earth metal hydroxides or mixtures thereof, more preferably with alkali metal hydroxides, in particular sodium hydroxide. The conversion is preferably carried out in the presence of an aqueous or alcoholic solution of an alkali metal hydroxide. The concentration of the aqueous sodium hydroxide solution is in the range from 10 to 50 wt %, preferably 20 to 40 wt %. This method provides aminomethylated vinylaromatic bead polymers having a degree of substitution on the aromatic rings of up to 1.5.

The aminomethylated vinylaromatic bead polymer formed in the process of this method can be washed alkali-free with completely ion-free water.

The aminomethylated vinylaromatic bead polymer may be reacted with further alkylating agents to form anion exchangers or chelating resins or else be used as ion exchanger.

It is further possible to react the aminomethylated vinylaromatic bead polymers of the present invention with halomethyl nitrogen heterocycles, e.g., 2-chloromethylpyridine, 3-chloromethylpyridine or 4-chloromethylpyridine, and thereby prepare chelating resins.

The present invention accordingly also provides a method of producing anion exchangers and chelating resins which comprises
a) reacting monomer droplets formed from at least one monovinylaromatic compound and from at least one polyvinylaromatic compound and also optionally a porogen and at least one initiator to form a vinylaromatic bead polymer,
b) converting this vinylaromatic bead polymer in the presence of compounds of formula (II) and in the presence of compounds of formula (I) and at least one condensed formaldehyde and in the presence of at least one protic acid into amidomethylated vinylaromatic bead polymer, and
c) converting the amidomethylated vinylaromatic bead polymer into aminomethylated vinylaromatic bead polymer, and
d) finally reacting the aminomethylated vinylaromatic bead polymer with alkylating agent to form anion exchangers and chelating resins.

Preferred alkylating agents for the purposes of the present invention are alkyl halides, haloalcohols, alkyl sulfates, dialkyl sulfates, alkyl oxides, Leuckart-Wallach reagents or combinations thereof in between and/or in succession.

Particular preference is given to employing chloromethane, ethylene oxide, propylene oxide and also the Leuckert-Wallach reagents or their combination. Leuckart-Wallach reagents are described by way of example in Organikum, VEB Deutscher Verlag der Wissenschaften, Berlin 1968, 8th edition, page 479.

Water or mineral acids are employed as suspension medium. But optionally bases may also be added depending on the desired product. It is preferred to employ water. Aqueous sodium hydroxide solution, aqueous potassium hydroxide solution or basic but not nucleophilic amines are optionally useful as bases.

Step d) is carried out at temperatures of 20 to 150° C., preferably at temperatures of 40 to 110° C. Step d) is carried out at pressures ranging from atmospheric pressure to 6 bar, preferably ranging from atmospheric pressure to 4 bar.

The present invention makes available a novel method of producing amidomethylated vinylaromatic bead polymers that provides specifically phthalamidomethylated bead polymers and aminomethylated bead polymers efficiently, taking into account ecological aspects and in high yield.

EXAMPLE 1

1.1 Preparation of Monodisperse Macroporous Bead Polymer on the Basis of Styrene, Divinylbenzene and Ethyistyrene A 10 l glass reactor is charged with 3000 g of completely ion-free water, and a solution of 10 g of gelatin, 16 g of disodium hydrogenphosphate dodecahydrate and 0.73 g of resorcinol in 320 g of completely ion-free water is added and mixed in. The mixture is equilibrated to 25° C. Subsequently, while stirring, a mixture of 3200 g of microencapsulated monomer droplets having a narrow particle size distribution, composed of 3.1% by weight of divinylbenzene and 0.6% by weight of ethyistyrene (used in the form of a commercial isomer mixture of divinylbenzene and ethylstyrene with 80% divinylbenzene), 0.4% by weight of dibenzoyl peroxide, 58.6% by weight of styrene and 37.5% by weight of isododecane (technical isomer mixture having a high proportion of pentamethylheptane) is applied, the microcapsule consisting of a formaldehyde-hardened complex coacervate composed of gelatin and a copolymer of acrylamide and acrylic acid, and 3200 g of aqueous phase having a pH of 12 are added.

The mixture is stirred and polymerized to completion by increasing the temperature in accordance with a temperature program beginning at 25° C. and ending at 95° C. The mixture is cooled, washed through a 32 μm sieve and then dried at 80° C. under reduced pressure.

This gives 1893 g of a bead polymer having narrow particle size distribution.

1.2. Preparation of Phthallmidomethylated Monodisperse Macroporous Bead Polymer with the Swellant Benzotrifluoride A round-bottom flask is charged with 713 g of benzotrifluoride. This initial charge is admixed with 103.6 g of bead polymer from example 1.1, 147.1 g of phthalimide and 31.3 g of paraformaldehyde, and the mixture is subsequently stirred at room temperature for 30 minutes. Over the course of 30 minutes, and with accompanying cooling, 367.2 g of sulfuric acid (96%) are added dropwise, such that a temperature of 25° C. is not exceeded. This is followed by stirring at room temperature for 24 hours, after which the beads are separated off on a sieve and washed with water, acetone, acetic acid and water.

Volume yield: 570 ml
Nitrogen content (after drying): 5.2%

EXAMPLE 2

Comparative Example (not Inventive)

2.1 Preparation of Phthallmidomethylated, Monodisperse, Macroporous Bead Polymer with the Swellant Dichloroethane A round-bottom flask is charged with 625 g of 1,2-dichloroethane. This initial charge is admixed with 103.6 g of bead polymer from example 1.1, 147.1 g of phthalimide and 31.3 g of paraformaldehyde, and the mixture is subsequently stirred at room temperature for 30 minutes. Over the course of 30 minutes, 363.3 g of sulfuric acid (96%) are added dropwise and this is followed by stirring at room temperature for 24 hours. Thereafter the beads are separated off on a sieve and washed with water, acetone, acetic acid and water.

Volume yield: 605 ml
Nitrogen content (after drying): 5.1%

EXAMPLE 3

Comparative Example (not Inventive)

3.1 Preparation of Phthallmidomethylated, Monodisperse, Macroporous Bead Polymer with the Swellant Fluorobenzene A round-bottom flask is charged with 371 g of fluorobenzene. This initial charge is admixed with 62.2 g of bead polymer from example 1.1, 88.2 g of phthalimide and 18.8 g of paraformaldehyde, and the mixture is subsequently stirred at room temperature for 30 minutes. Over the course of 30 minutes, and with accompanying cooling, 218.3 g of sulfuric acid (96%) are added dropwise, such that a temperature of 25° C. is not exceeded. This is followed by stirring at room temperature for 24 hours, after which the beads are separated off on a sieve and washed with water, acetone, acetic acid and water.

Volume yield: 156 ml
Nitrogen content (after drying): 0.2%

EXAMPLE 4

Comparative Example (not Inventive)

4.1 Preparation of Phthallmidomethylated, Monodisperse, Macroporous Bead Polymer with the Swellant Acetic Acid/Acetic Anhydride At room temperature, 180 g of acetic acid are charged to a round-bottom flask. Added to this initial charge are 48.3 g of paraformaldehyde and 220.7 g of phthalimide. This is followed by the dropwise addition to the suspension of 7.4 g of sulfuric acid (100%/), and the mixture is heated to 70° C. and stirred at 70° C. for 1 hour. Then 153 g of acetic anhydride are added dropwise over the course of 0.5 hours. After that, 159.2 g of monodisperse bead polymer from example 1.1 are added and subsequently over the course of 2 hours, 286.9 g of sulfuric acid (100%) are metered in. The suspension is heated to 115° C. and stirred at this temperature for a further 10 hours. It is cooled to 70° C. and the beads are separated off on a sieve. The beads are subsequently washed twice with acetic acid at 70° C. and three times with completely ion-free water at 70° C.

Volume yield: 725 ml
Nitrogen content (after drying): 4.5%

What is claimed is:

1. A method of producing amidomethylated vinylaromatic bead polymers, the method comprising contacting
   at least one condensed formaldehyde,
   at least one vinylaromatic bead polymer, and
   at least one compound of formula (I) or salts thereof

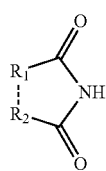

(I)

where
$R_1$=—CH—($C_1$-$C_6$-alkyl) or —CH$_2$—, and $R_2$=—CH—($C_1$-$C_6$-alkyl) or —CH$_2$—, or
$R_1$ and $R_2$ are two carbon atoms of an aromatic $C_6$-ring optionally substituted by one or two $C_1$-$C_6$-alkyl radicals, or
$R_1$ and $R_2$ each represent —CH=,
in the presence of
at least one protic acid, wherein said protic acid is sulfuric acid having a concentration of at least 93 wt. %, and
at least one compound of the formula (II)

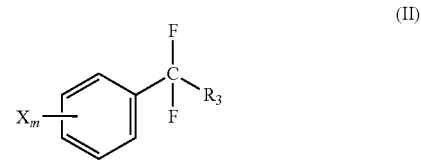

(II)

where
$R_3$=$C_1$-$C_4$-alkyl, F, Cl, or wholly or partly chlorinated or wholly or partly fluorinated $C_1$-$C_4$-alkyl,
X=Cl or F, and
m=0, 1 or 2.

2. The method as claimed in claim 1, wherein the compounds of the formula (II) are selected from chlorobenzotrifluoride, dichlorobenzotrifluoride, benzotrifluoride, or mixtures thereof.

3. The method as claimed in claim 1, wherein the condensed formaldehyde is paraformaldehyde or trioxane or mixtures thereof.

4. The method as claimed in claim 1, wherein the vinylaromatic bead polymer is a styrene/divinylbenzene copolymer.

5. The method as claimed in claim 1, wherein the compound of the formula (I) is phthalimide or salts thereof.

6. The method as claimed in claim 1, wherein the vinylaromatic bead polymer comprises a monodisperse, vinylaromatic bead polymer.

7. The method as claimed in claim 1, wherein the vinylaromatic bead polymer comprises a macroporous, monodisperse, vinylaromatic bead polymer.

8. The method as claimed in claim 1, wherein a ratio of amounts of the compounds of formula (II) to the compounds of formula (I) is 3.5:1 to 9:1.

9. The method as claimed in claim 1, wherein a ratio of amounts of the aromatic groups in the vinylaromatic bead polymer to the compounds of formula (I) is 0.5:1 to 1.8:1.

10. The method as claimed in claim 1, wherein a ratio of amounts of the compounds of formula (I) to the condensed formaldehyde is 0.95:1 to 1.1:1.

11. The method as claimed in claim 1, wherein a ratio of amounts of the compounds of formula (I) to the protic acid is 10:1 to 1:10.

12. The method as claimed in claim 1, wherein the contacting is done at a temperature of 20° C. to 40° C.

13. The method as claimed in claim 1, wherein:
   a ratio of amounts of the compounds of formula (II) to the compounds of formula (I) is 2:1 to 10:1;
   a ratio of amounts of the aromatic groups in the vinylaromatic bead polymer to the compounds of formula (I) is 0.2:1 to 2.5:1;
   a ratio of amounts of the compounds of formula (I) to the condensed formaldehyde is 0.7:1 to 1.3:1; and a ratio of amounts of the compounds of formula (I) to the protic acid is 10:1 to 1:10.

14. The method as claimed in claim 13, wherein:
a ratio of amounts of compounds of formula (II) to the compounds of formula (I) is 3.5:1 to 9:1;
a ratio of amounts of aromatic groups in the vinylaromatic bead polymer to the compounds of formula (I) is 0.5:1 to 1.8:1;
a ratio of amounts of compounds of formula (I) to condensed formaldehyde is 0.95:1 to 1.1:1; and
a ratio of amounts of the compounds of formula (I) to the protic acid is 1:1 to 1:10.

15. The method as claimed in claim 1, wherein:
the compound of the formula (II) is selected from the group consisting of benzotrifluoride, pentafluoroethanebenzene, pentachloroethanebenzene, 4-chlorobenzotrifluoride, 3-chlorobenzotrifluoride, 2-chlorobenzotrifluoride, dichlorobenzotrifluoride, difluoroethanebenzene, 3,4-dichlorobenzotrifluoride, heptafluoropropanebenzene, 1,1-difluoropentachloropropanebenzene, and mixtures of these compounds;
the protic acid is selected from the group consisting of hydrochloric acid, sulfuric acid, oleum, nitric acid, nitrous acid, sulfurous acid, aliphatic or aromatic methane, benzene or toluenesulfonic acids, phosphoric acid, oxalic acid, acetic acid and formic acid;
the condensed formaldehyde is selected from compounds of formula (III)

(III)

where n is =8 to 100, or trioxane, or mixtures thereof;
the vinylaromatic bead polymer is a copolymer derived from monomeric units of:
monoethylenically unsaturated compounds selected from the group consisting of styrene, vinyltoluene, ethylstyrene, a-methylstyrene, chlorostyrene, chloromethylstyrene, and mixtures thereof; and
multifunctional ethylenically unsaturated compounds selected from the group consisting of divinylbenzene, divinyltoluene, trivinylbenzene, divinylnaphthalene, trivinylnaphthalene, and mixtures thereof; and
the compound of the formula (I) is phthalimide, succinimide, maleimide, salts of phthalimide, succinimide, and maleimide, and mixtures thereof.

16. The method as claimed in claim 15, wherein:
the compounds of the formula (II) are selected from chlorobenzotrifluoride, dichlorobenzotrifluoride, benzotrifluoride, or mixtures thereof;
the protic acid is sulfuric acid;
the condensed formaldehyde is paraformaldehyde or trioxane or mixtures thereof;
the vinylaromatic bead polymer is a styrene/divinylbenzene copolymer; and
the compound of the formula (I) is phthalimide or salts thereof.

17. The method as claimed in claim 16, wherein:
a ratio of amounts of the compounds of formula (II) to the compounds of formula (I) is 2:1 to 10:1;
a ratio of amounts of the aromatic groups in the vinylaromatic bead polymer to the compounds of formula (I) is 0.2:1 to 2.5:1;
a ratio of amounts of the compounds of formula (I) to the condensed formaldehyde is 0.7:1 to 1.3:1; and
a ratio of amounts of the compounds of formula (I) to the protic acid is 10:1 to 1:10.

18. The method as claimed in claim 17, wherein:
a ratio of amounts of compounds of formula (II) to the compounds of formula (I) is 3.5:1 to 9:1;
a ratio of amounts of aromatic groups in the vinylaromatic bead polymer to the compounds of formula (I) is 0.5:1 to 1.8:1;
a ratio of amounts of compounds of formula (I) to condensed formaldehyde is 0.95:1 to 1.1:1; and
a ratio of amounts of the compounds of formula (I) to the erotic acid is 1:1 to 1:10.

* * * * *